United States Patent [19]

Fiechter

[11] Patent Number: 5,025,566

[45] Date of Patent: Jun. 25, 1991

[54] ELECTRONIC GAGE AND LEVELMETER

[76] Inventor: René A. Fiechter, 137 Hollywood Ave., Douglaston, N.Y. 11363

[21] Appl. No.: 491,278

[22] Filed: Mar. 9, 1990

[51] Int. Cl.$^5$ .......................... G01B 5/14; G01C 9/06
[52] U.S. Cl. ....................................... 33/338; 33/366; 33/523.1
[58] Field of Search ............ 33/338, 366, 523, 523.1, 33/523.2, 1 Q, 287, 377, 651, 651.1

[56] References Cited

U.S. PATENT DOCUMENTS

| | | | |
|---|---|---|---|
| 1,220,027 | 3/1917 | Toney | 33/338 |
| 1,373,982 | 4/1921 | Smith | 33/338 |
| 2,286,456 | 6/1942 | Boettcher | 33/523.1 |
| 4,027,397 | 6/1977 | Theurer et al. | 33/287 |
| 4,641,434 | 2/1987 | Engler | 33/366 |

FOREIGN PATENT DOCUMENTS

| | | | |
|---|---|---|---|
| 0180907 | 10/1983 | Japan | 33/366 |
| 1154213 | 6/1969 | United Kingdom | 33/523.1 |

Primary Examiner—Harry N. Haroian
Attorney, Agent, or Firm—Alfred W. Barber

[57] ABSTRACT

The new instrument is a three piece frame which folds into a compact, hand carried device and when opened forms a track spanning frame. In its open position the frame carries on its midsection an electronic levelmeter and the track gage meter or indicator.

The main frame consists of four arms. Two of these arms are hinged to fold on themselves for carrying and opening into a straight line for making measurements of gage and level. The other two arms fold back onto the first two for carrying and open at a predetermined angle to support the first mentioned arms in a perpendicular relationship to the track being observed.

Under the three outer ends of the arms are feeler contacts. The two on the angled arms are fixed to ride on the inner edge of one of the tracks being measured. A third feeler contact is carried under the end of the single and oppositely extended arm. This third contact is moveable to contact the inner edge of the second track and is coupled to a gage monitoring device to monitor the gage of the two rails under the three arms of the device of my invention, level monitoring means is carried on one of the arms.

1 Claim, 2 Drawing Sheets

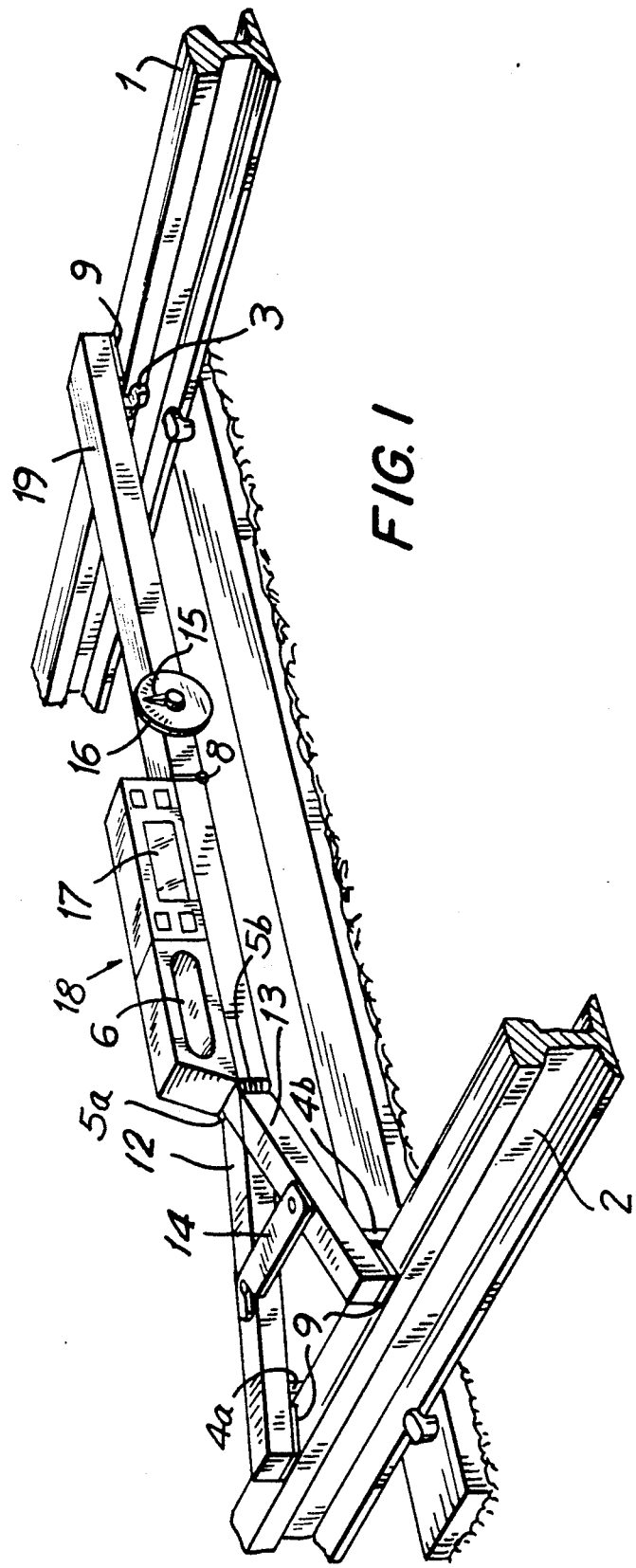

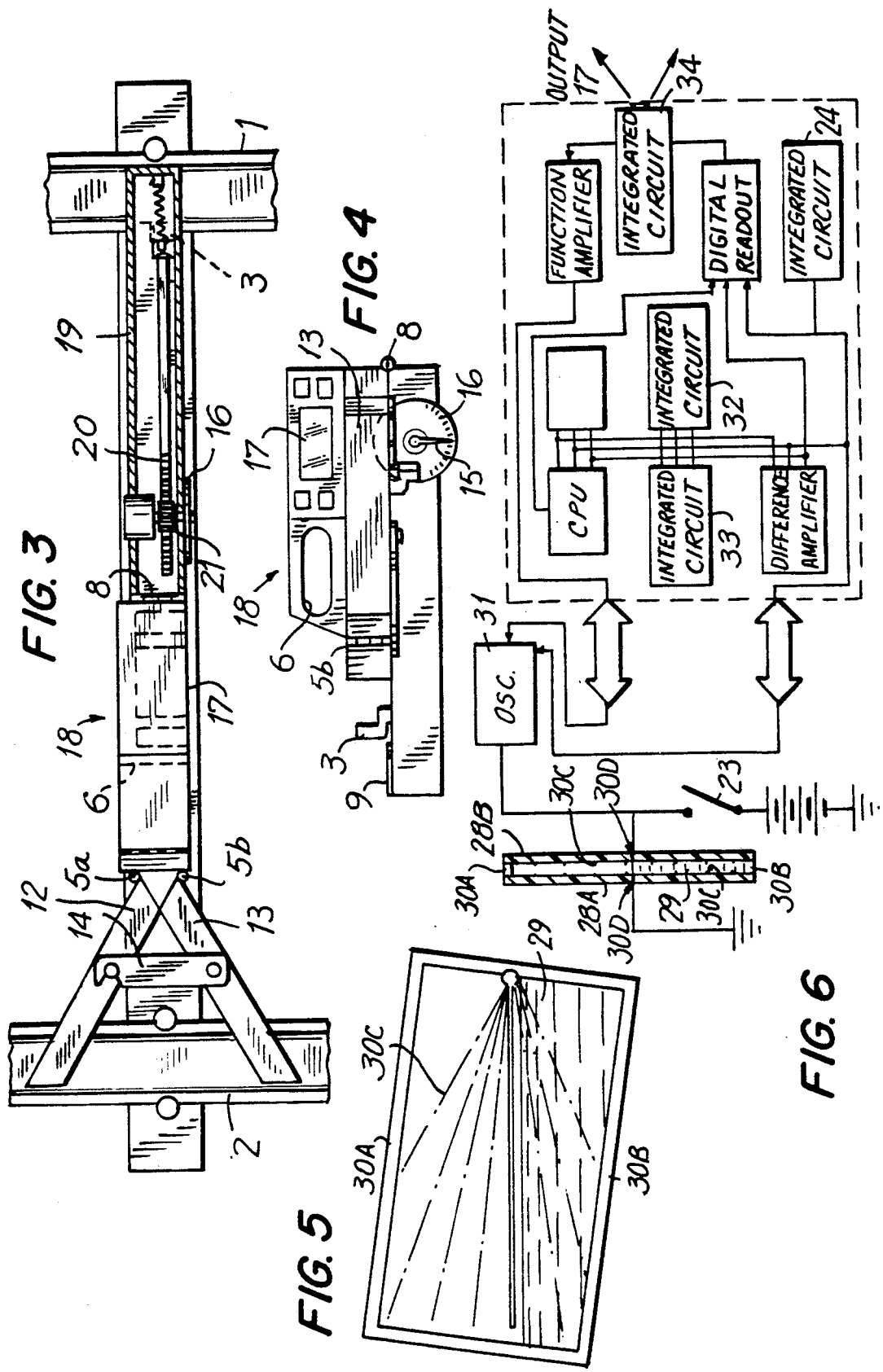

ELECTRONIC GAGE AND LEVELMETER

SUMMARY OF THE INVENTION

Two geometrical characteristics of railroad tracks which are important are the gage and the cross level. Equipment available in the past has been heavy and cumbersome. The object of my present invention is to provide a light and readily portable means for making these measurements. My device includes an electronic level meter and a gage both capable of providing computer readable outputs. My invention can be hand-carried from place to place and the information gathered recorded in a hand-held computer.

The basis for my new Instrument is a three piece frame which folds into a compact, hand carried device and when opened forms a track spanning frame. In its open position the frame carries on its midsection an electronic levelmeter and the track gage meter or indicator.

The main frame consists of four arms. Two of these arms are hinged to fold on themselves for carrying and opening into a straight line for making measurements of gage and level. The other two arms fold back onto the first two for carrying and open at a predetermined angle to support the first mentioned arms in a perpendicular relationship to the track being observed.

Under the three outer ends of the arms are feeler contacts. The two on the angled arms are fixed to ride on the inner edge of one of the tracks being measured. A third feeler contact is carried under the end of the single and oppositely extended arm. This third contact is moveable to contact the inner edge of the second track and is coupled to a gage monitoring device to monitor the gage of the two rails under the three arms of the device of my invention.

My invention also includes level monitoring means carried on one of the arms. I prefer an electronic device consisting of two plates substantially parallel forming a cavity between them partially filled with fluid which shifts position in relation to the plates when the level meter changes its orientation in relation to the horizontal. The plates carry a plurality of isolated conducting sectors providing a varying capacitance when the level changes. The capacitor(conducting) elements provide signals which have each a period and frequency which depends on the capacitance of the sensor. A comparator reads these periods of frequencies in terms of angle with the horizontal and stores the result in memory.

In the Drawings

FIG. 1 is a perspective view of my invention extended for use.

FIG. 2 is a front elevation view of FIG. 1 with a portion cut away to show the rack and pinion of the gage mechanism.

FIG. 3 is a top view of FIG. 1 with partially cut away to show the encoder linked to the pinion on one axle.

FIG. 4 is a side view of my invention folded for easy carrying.

FIG. 5 is a front view of the plates forming a variable capacitor responsive to tilt.

FIG. 6 is a side view of FIG. 5 and a block diagram of the electronics used for measuring tilt.

FIG. 1 shows my invention in perspective sitting across a pair of rails 1 and 2. My invention consists in a portable device which carries gage and level measuring means and is constructed in several foldable sections which, when opened, provide track spanning means and when folded provide a compact package for hand-carrying. Two sections 18 and 19 are hinged at 8 in order to be folded back for carrying and opened so that they are in line for measuring purposes, at the opposite end of section 18 are two laterally hinged arms 12 and 13 hinged at 5a and 5b and which folds laterally against section 18 for carrying and open at an angle defined by cross-brace 14 for aligning section 19 perpendicular to track 1 for making gage measurements.

My measuring device is to be insulated from the tracks 1 and 2 as by the insertion of insulating pads 9 and by using feelers (described below) which are non-conducting. These measures are required so that tracks carrying electrical currents will not be shorted.

Arm 19 carries an indicator dial 15-16 which is coupled to a track gage feeler 3 and indicates the actual gage of the track at the point of investigation. Arms 12 and 13 are hinged at 5a and 5b so as to extend in a V shape maintained by cross arm 14. Under the ends of arms 12 and 13 are feelers 4b and 4a respectively. When arms 12, 13 and 19 are extended as shown, the distance between feelers 4a and 4b and 3 is indicated on dial 16 by indicator 15 which is linked to feeler 3 by means of a gear and track as shown in FIG. 3.

Center section 18 carries the carrying holder with hand-grip opening 6 and the level measuring instrument 17. There are a number of ways in which the level can be measured. I prefer the variable capacitor means shown in FIG. 6 and described below.

FIG. 2 is a side view of my invention more clearly disclosing certain features. The orientation of hinges 5 and 8 is shown. Feelers 3, 4a and 4b are also shown as well as insulating pads 9 resting on rails 1 and 2.

FIG. 3 is a bottom view in order to show still further details. In this FIG. is shown gear track 20 which couples feeler 3 to indicator 15 through gear 21. Variations in the gage of the track cause feeler 3 to move and then through the rack 20 and pinion 21 to rotate indicator arm 15 thereby indicating the gage of the track at that point.

FIG. 6 shows details of my preferred form of level meter in expanded form to aid in its description. The components shown in FIGS. 5 and 6 are contained in the area 6 of FIGS. 1, 2, 3 and 4. Two parallel non-conducting plates 28A and 28B are sealed by peripheral seal 30A and partly filled with a fluid. On the inner surfaces of plates 28A and 28B there are conducting strips 30. An electrical circuit across the plates is provided by conductor 30B. The plates as described above act like a capacitor which receives a bias from a battery 23 and presents a capacitative reactance to oscillator 31. This capacitance depends on the tilt of plates 28A and 28B and hence so does the frequency of oscillator 31. The integrated circuits in boxes 32, 33 and 24 compare the frequency of oscillator 31 with a table of frequencies and provide an output on line 17 which is a measure of the tilt of the rails being inspected i.e. 1 and 2.

An added feature of my invention is that the gage and tilt factors measured as described above can be outputted to a hand-held computer for creating a record of the readings taken. The output of gage indicator 15-16 is made through the coupled counter 22 which is designed and calibrated to read the gage of tracks 1 and 2. The tilt is read by coupling the hand-held computer to output line 17.

Of major importance to my invention is its easy portability. As shown in FIG. 4 it may be folded into a compact package for hand-carrying. Arm 19 folds back around hinge 8 to rest under the center body 18. Arms 12 and 13 fold back on each side of center body 18 on hinges 5a and 5b.

What is claimed is:

1. A portable measuring device including in combination; four substantially equal arms, one comprising a central portion including a carrying handle, a second arm hinged to open coaxially with said central portion; a third and fourth arms hinged to open oppositely to said second arm and to form a V with its apex at the central portion, and including an electronic level means mounted on one of said arms and a mechanically coupled gage indicator mounted on one of said arms, wherein when extended said arms are capable of spanning across a railroad track for indicating the level and gage of said track.

* * * * *